Patented Aug. 29, 1933

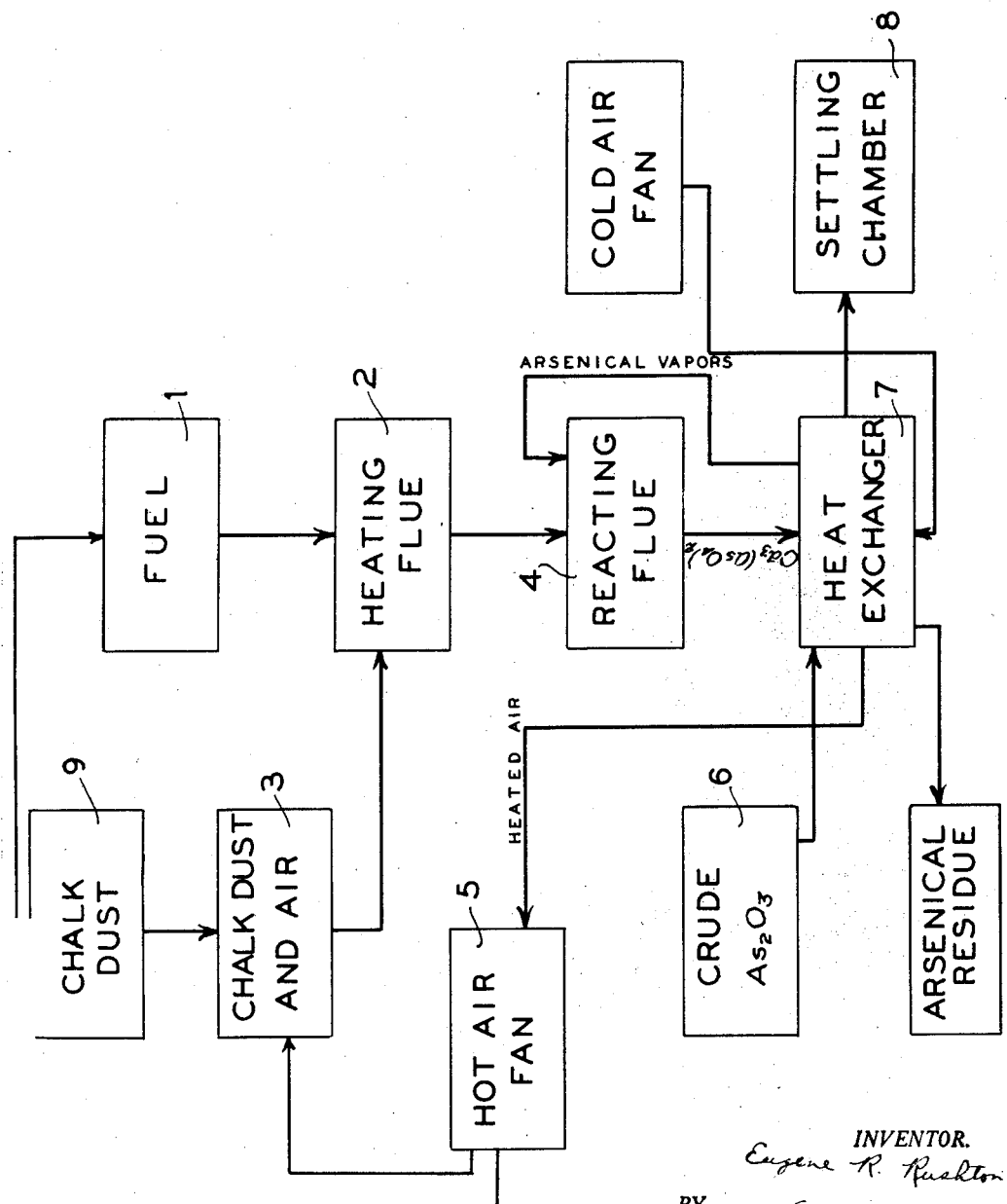

1,924,518

UNITED STATES PATENT OFFICE 1,924,518

METHOD OF PRODUCING INSECTICIDES

Eugene R. Rushton, Montgomery, Ala.

Application August 18, 1930. Serial No. 476,173

15 Claims. (Cl. 23—53)

The present invention has to do with a new and improved process of producing arsenic compounds, and particularly those arsenates which have been found of great utility as insecticides.

My invention will be illustrated in terms of calcium arsenate production, but it is to be distinctly understood that barium, magnesium and lead arsenate may be prepared in an entirely analogous manner. In preparing calcium arsenate, calcium oxide, limestone or chalk is blown into a reaction chamber containing arsenical vapors, in the form of a "dust stream". That is to say the chalk or equivalent compound is blown into the reaction zone in the form of a very light powder, whence a very intimate contact between the said chalk or equivalent compound and the arsenical vapors is attained.

In order to more readily explain the theory of operation of my novel process for preparing calcium arsenate, it may be said that my process involves a practical application of a broad principle enunciated by Simon in 1837 (Poggendorf Ann. 40, p. 417). Simon found when calcium arsenite is heated in the absence of air, calcium arsenate and elementary arsenic are formed. The tendency to form arsenate is so great that part of the arsenious oxide combined with the lime is reduced to supply the oxygen necessary to oxidize the remaining arsenious oxide to the pentoxide. Of course, when air is present, the arsenic is re-oxidized to the trioxide, some of which escapes as vapor. I have found that if chalk, for example be previously heated to such a degree that the vapor pressure of the carbon dioxide content of the chalk is nearly equal to one atmosphere and this chalk is introduced into a reaction chamber in the form of an air suspension or "dust stream", that it will form with arsenious oxide vapors and air therein contained, a very satisfactory form of calcium arsenate.

That is to say, the calcium arsenate is in the form of a light, fluffy powder which can readily be blown out of a dusting machine such as that commonly used in dusting cotton plants with an insecticide, on to the plant.

As regards the source of arsenic, I may use either metal arsenic or arsenious oxide (the white arsenic of commerce) as a starting material, but I have found that, in order to insure that no impurities will appear in the final product that, it is advisable to vaporize the arsenic or arsenious oxide in a chamber prior to its introduction into the reaction zone since non-volatile impurities are thus left behind in the vaporizing chamber. Consequently, by this method, impure dust from smelters or roasting furnaces can be used as raw materials and calcium arsenate may be produced directly from unrefined arsenical dust.

In the matter of heat source and conservation of the same, I find that it is preferable to use a gaseous fuel in my process and that in order to conserve the heat generated in the process, it is advisable to pass the arsenical vapors in heat exchange relationship with the hot product coming from the reacting flue as indicated in the drawing.

As regards the source of chalk or limestone, it may be stated that various grades of the same from various sources may be used. Thus, for example, the chalk produced as a by-product in the causticization of sodium carbonate or in the manufacture of "85 per cent magnesia" may be used. If the chalk has a small amount of sodium salts associated therewith, no deleterious effect is produced in the final product but on the contrary a benefit accrues to the final product since the slight hygroscopicity thereby produced as a result of traces of sodium salts or even free caustic soda imparts a slight moistening effect on the product after it is dusted on the plants and hence it tends to function as an adhesive and thereby lessen the tendency of the powder to be shaken off the plants, if they are blown by wind.

My process may be carried out in numerous types of apparatus and the embodiment illustrated by the accompanying drawing is merely diagrammatic and specific details will be readily apparent to one skilled in the art.

Referring specifically to the accompanying drawing, air and fuel are introduced into the heating flue 2 until the heating flue reaches the desired temperature which is between 800° to 1000° C., when the fuel supply is reduced or cut off completely. Chalk dust and air are then blown into the heating flue 2, the air having been previously preheated by passage through heat exchanger 7. The chalk dust and air then pass into the reacting flue 4, meanwhile crude arsenic is fed into the reacting flue via the heat exchanger 7 wherein it is vaporized. Due to the stream of air laden with chalk dust as it enters, and calcium arsenate as it leaves the reacting flue, an injector effect or suction draws the arsenical vapors into the said reacting flue. The amount of air passed through the reacting flue is in excess of that required for the oxidation of the arsenious oxide to arsenate, this excess being about 30%. The chemical reaction taking place in reacting flue 4 may be represented by the following chemical equation:

$$As_2O_3 + 3CaO + O_2 = Ca_3(AsO_4)_2$$

The calcium arsenate thus formed is conducted by the air stream into heat exchanger 7 and finally into settling chamber 8.

The reacting flue 4 mentioned above may be of simple construction, consisting merely of an elongated tube. The dimensions of this tube may vary within rather wide limits but in a preferred form it should be at least thirty feet long.

As regards the construction of heat exchanger 7 which in reality is also a vaporizer for the arsenious oxide, any known type may be used. Thus, the heat exchanger may be of very simple construction comprising two concentric tubes in the inner of which the stream of calcium arsenate laden air is passed while crude arsenic is fed into the top of the outer tube and as it descends it receives heat from the said inner tube and is vaporized. In this latter vaporization step, of course, non-volatile impurities will fall to the bottom of the said outer tube and may be withdrawn from time to time as the occasion may arise. In the accompanying diagrammatic sketch incoming air is preheated in the heat exchanger 7. In order to accomplish this the above two tube heat exchanger could be supplanted by a three tube exchanger, the inner tube being of comparatively small diameter and serving as a conduit for the incoming air, the hot dust stream thus serving a double function of preheating incoming air and vaporizing arsenical vapors.

As may be readily seen from the accompanying drawing fans or blowers are used to maintain a constant circulation of air. If it so happens that the chalk requires grinding this may be done by crushing rollers or similar device. The chalk dust may preferably be introduced into chamber 3 tangentially to the direction of the incoming current of heated air whence it is swept into heating flue 2. The supply of chalk entering chamber 3 should be so regulated that substantially all of it is swept forwardly and consequently none of it is allowed to settle to the bottom of the chamber. The entire system may be provided with dampers at any convenient point by means of which the air stream may be controlled in any desired manner.

By a "dust stream" I mean a suspension of a solid in a current of air.

As used in the claims, an excess of oxygen signifies that the amount present is greater than that required for the oxidation of arsenical vapor to the pentavalent oxide.

As used in the claims, "arsenical vapor" includes metallic arsenic and oxides thereof.

It is to be distinctly understood that I do not limit myself to the specific details mentioned herein, but include as part of my invention all modifications thereof as may reasonably fall within the scope of the appended claims.

What I claim is:

1. The process of producing insecticides which comprises reacting arsenical vapors and an oxygenated compound of the group consisting of calcium, barium, magnesium, and lead, the said compound being in the form of a dust stream.

2. The process of producing insecticides which comprises reacting arsenical vapors and a carbonate of a metal selected from the group consisting of calcium, barium, magnesium, and lead, the said carbonate being in the form of a dust stream.

3. A process for preparing calcium arsenate comprising reacting arsenical vapors and a compound selected from the group consisting of calcium oxide, calcium hydroxide, and calcium carbonate, the latter being in the form of a dust stream.

4. A process for preparing calcium arsenate comprising reacting arsenical vapors and calcium carbonate in the form of a dust stream.

5. A process for preparing calcium arsenate comprising reacting arsenical vapors and calcium carbonate in the form of a dust stream and in the presence of an excess of oxygen.

6. A process for preparing calcium arsenate comprising reacting arsenical vapors and calcium carbonate in the form of a dust stream and in the presence of excess oxygen and heat.

7. A process for preparing calcium arsenate which comprises reacting arsenic in the form of a vapor and calcium carbonate in the form of a dust stream in the presence of excess oxygen.

8. A process for preparing calcium arsenate which comprises reacting arsenious oxide in the form of a vapor and calcium carbonate in the form of a dust stream in the presence of excess oxygen and heat.

9. A process for preparing calcium arsenate which comprises reacting arsenious oxide and calcium oxide in the form of a dust stream.

10. A process for preparing calcium arsenate which comprises reacting arsenious oxide in the form of a vapor and calcium oxide in the form of a dust stream.

11. A process for preparing calcium arsenate which comprises reacting arsenious oxide in the form of a vapor and calcium oxide in the form of a dust stream in the presence of excess oxygen.

12. A process for preparing calcium arsenate which comprises reacting arsenious oxide in the form of a vapor and calcium oxide in the form of a dust stream in the presence of excess oxygen and heat.

13. A process for preparing calcium arsenate which comprises reacting arsenious oxide vapors and calcium carbonate in the form of a dust stream at temperatures between 800 to 1000° C.

14. A process for preparing calcium arsenate which comprises reacting arsenical vapors and calcium carbonate in the form of a dust stream at temperatures between 800 and 1000° C.

15. A process for preparing calcium arsenate which comprises reacting arsenical vapors and calcium carbonate in the form of a dust stream at temperatures between 800° C. and 1000° C., in the presence of excess oxygen.

EUGENE R. RUSHTON.